Feb. 6, 1951  R. E. CROSS ET AL  2,540,323
MACHINE TOOL
Filed Nov. 17, 1945  5 Sheets-Sheet 1
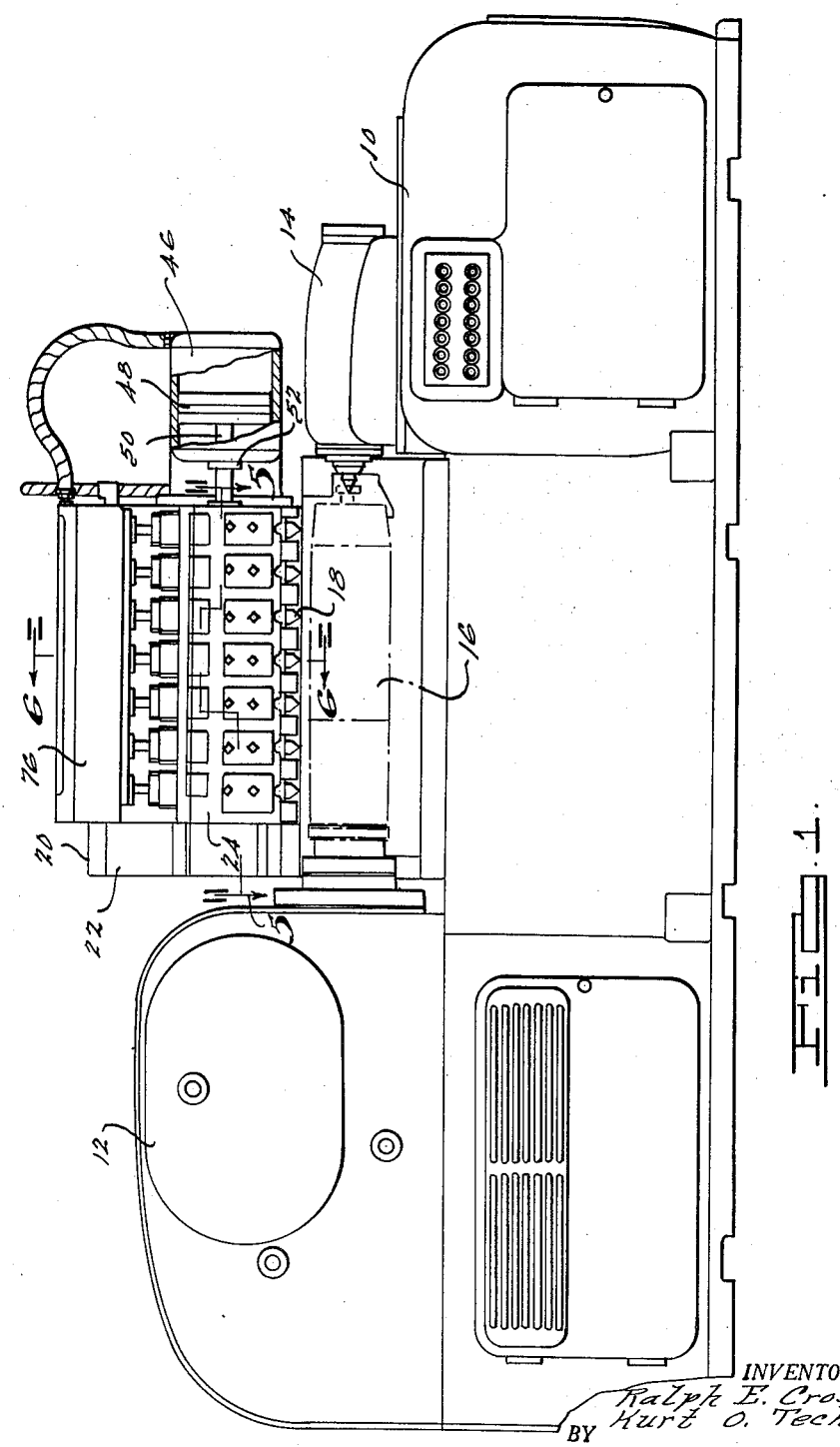
INVENTORS.
Ralph E. Cross,
Kurt O. Tech.
BY
Harness, Dickey & Pierce.
ATTORNEYS.

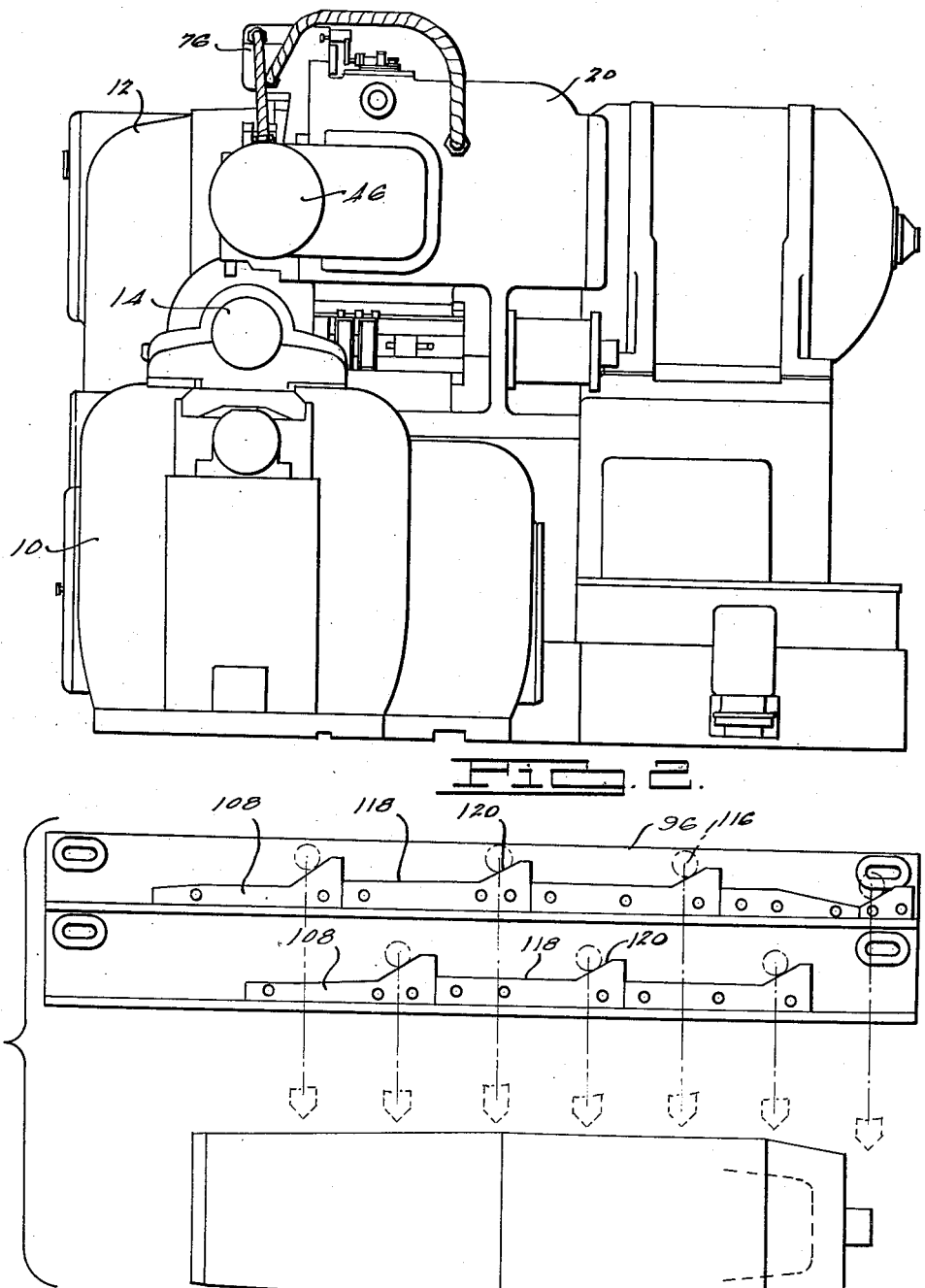

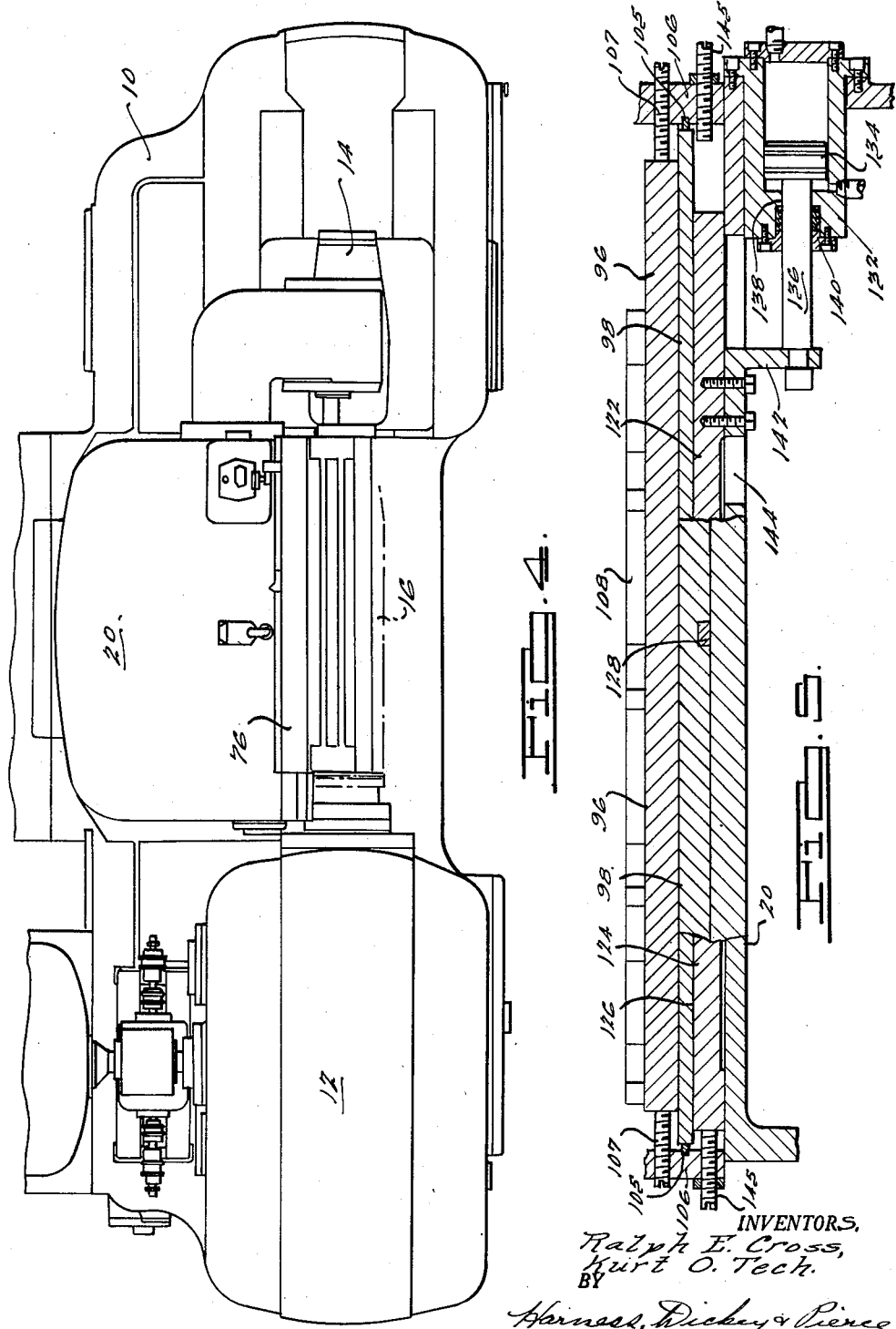

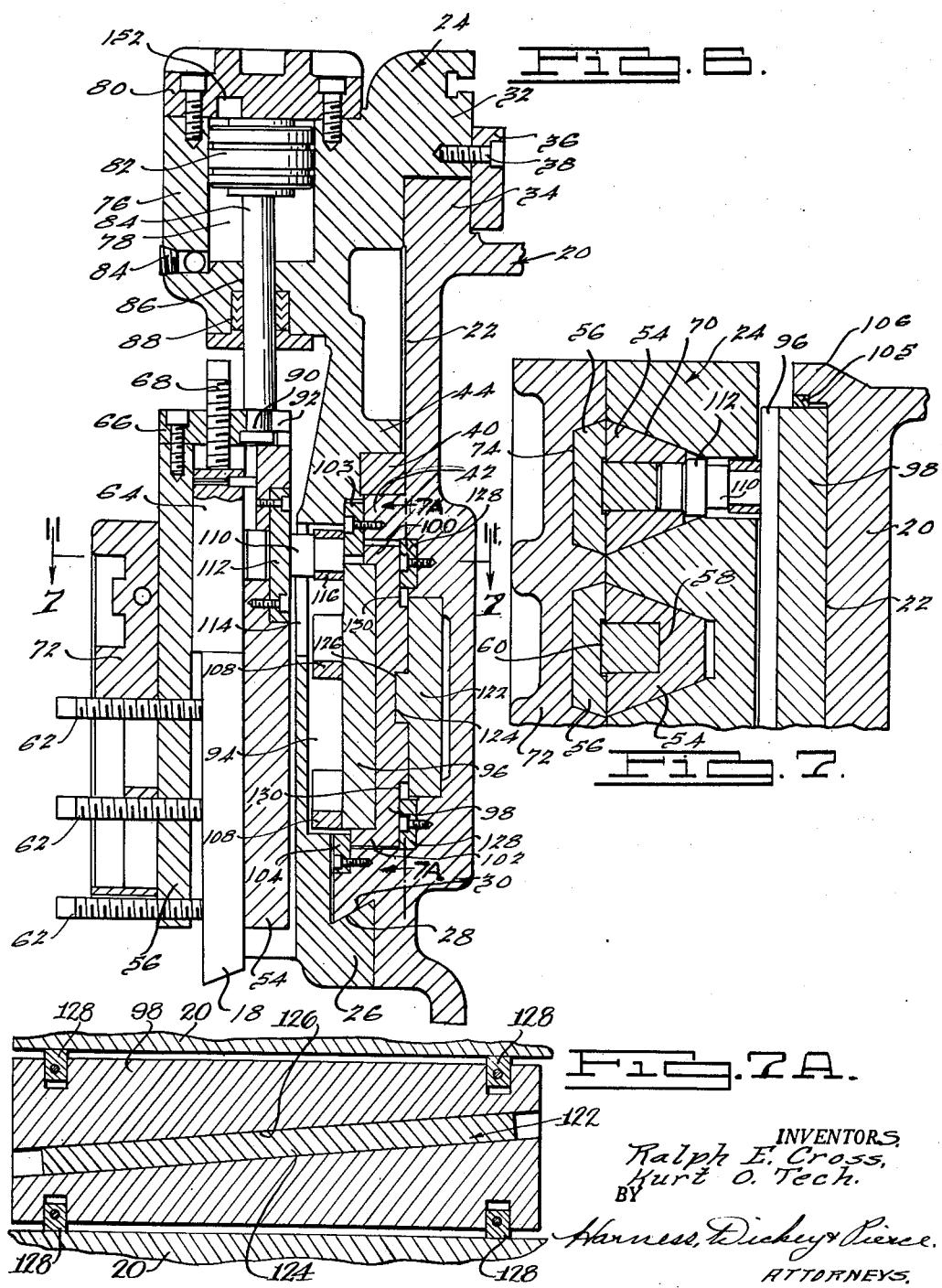

Feb. 6, 1951 — R. E. CROSS ET AL — 2,540,323
MACHINE TOOL
Filed Nov. 17, 1945 — 5 Sheets-Sheet 5
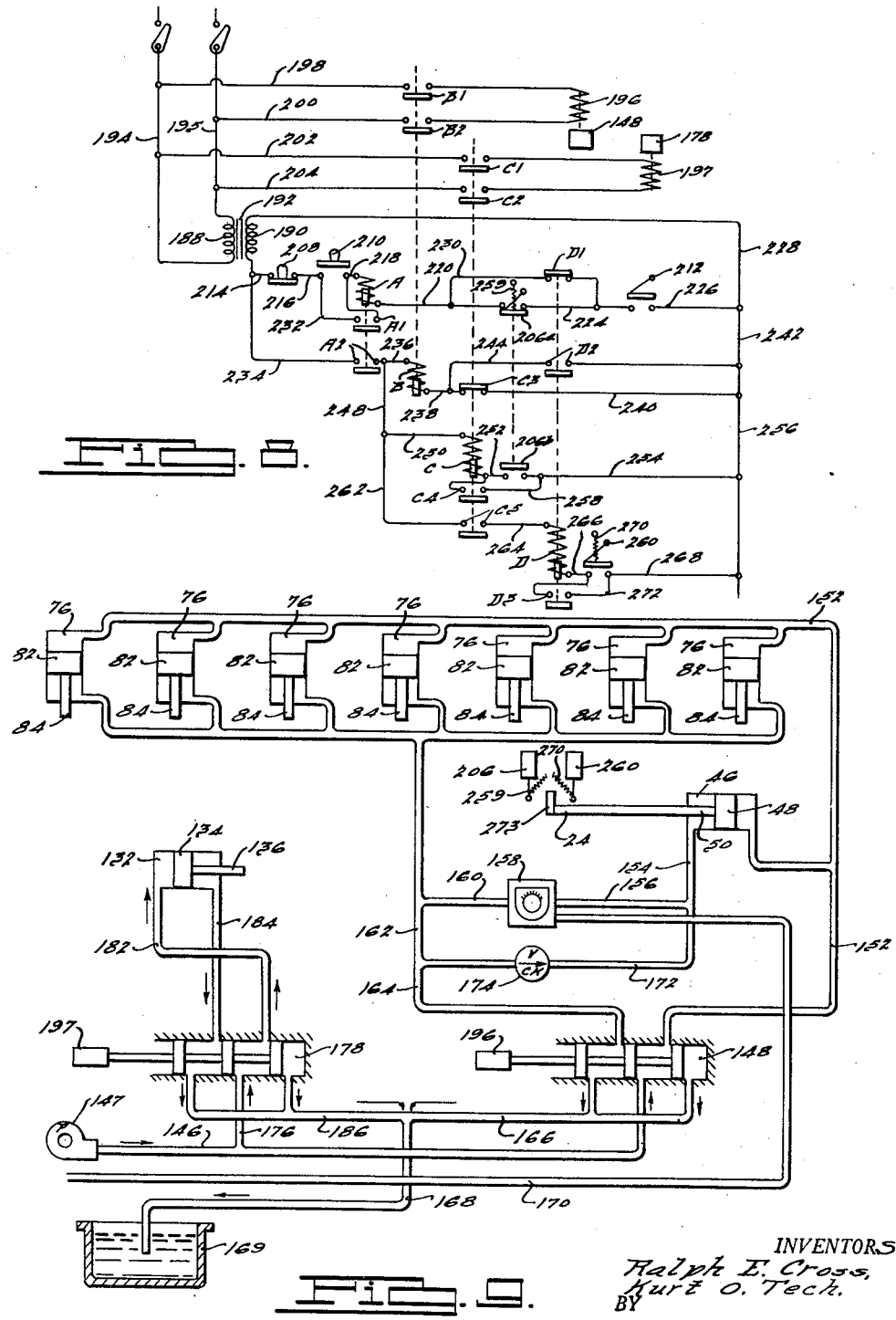
INVENTORS.
Ralph E. Cross,
Kurt O. Tech.
BY Harness, Dickey & Pierce.
ATTORNEYS.

Patented Feb. 6, 1951

2,540,323

UNITED STATES PATENT OFFICE 2,540,323

MACHINE TOOL

Ralph E. Cross, Grosse Pointe, and Kurt O. Tech, East Detroit, Mich.; said Tech assignor to said Cross Application November 17, 1945, Serial No. 629,228

7 Claims. (Cl. 82—14)

1

This invention relates to new and useful improvements in automatic lathes.

Metal castings frequently are considerably oversize. For example, in the case of shells for large caliber guns, the shell casting frequently is as much as two inches oversize. This excess metal accounts for approximately 160 lbs of the total weight of the casting and must be removed in a preliminary roughing operation. If the casting has a cylindrical outer surface, this operation may be done conveniently by means of a lathe; however, a great deal of time is required if conventional machines and methods are employed.

An important object of this invention is to provide a lathe that is eminently suited for use in heavy duty roughing operations of the type hereinabove referred to.

Another object of the invention is to provide a lathe that is rugged in construction and capable of handling relatively large workpieces.

Still another object of the invention is to provide a lathe of the above-mentioned character that can cut large amounts of metal from a workpiece in a minimum of time.

Yet another object of the invention is to provide a lathe of the above-mentioned character that automatically controls a plurality of cutting tools on one cutting stroke to remove a layer of metal from the workpiece and then automatically adjusts the control means so that another layer of material is removed from the workpiece on the second cutting stroke of the tools.

Other objects and advantages of the invention will be apparent during the course of the following description.

In the drawings forming a part of this specification and wherein like numerals are employed to designate like parts throughout the same, Fig. 1 is a front elevation of a lathe embodying the invention, Fig. 2 is an end elevation thereof, Fig. 3 is a front elevation of the cam plate comprising a part of the invention and showing diagrammatically how the cam plate controls the tools during the cutting operation, Fig. 4 is a fragmentary top plan view of the lathe, Fig. 5 is a fragmentary transverse sectional view taken on the line 5—5 of Fig. 1, Fig. 6 is a fragmentary vertical sectional view taken on the line 6—6 of Fig. 1, Fig. 7 is a fragmentary transverse sectional view taken on the line 7—7 of Fig. 6, Fig. 7A is a fragmentary, vertical, sectional view taken on the line 7A—7A of Fig. 6;

2

Fig. 8 is a wiring diagram schematically illustrating the electrical circuit for the lathe, and Fig. 9 is a diagrammatic view of the hydraulic circuit which controls the operation of the lathe.

Considered in certain of its broader aspects, the invention comprises a lathe equipped with a headstock and a tailstock for clamping and holding the workpiece, means for rotatably driving the workpiece, and a mechanism for controlling a plurality of cutting tools through two complete cycles of operation in such manner that the tools remove a layer of metal from the workpiece during one cycle of operation and are then automatically adjusted and positioned to remove a second layer of metal from the workpiece during the second cycle of operation.

The latter mechanism includes a tool carriage mounted for horizontal sliding movement on a suitable support. In the particular embodiment of the invention here shown, the carriage is provided with seven tool-carrying devices which are mounted vertically above the workpiece and disposed in horizontally spaced relation. Each of the cutting tools is moved vertically into and out of engagement with the workpiece by a hydraulic transmission and the carriage is driven horizontally by a separate hydraulic transmission to move the tools longitudinally along the workpiece. A cam plate is mounted on the support behind the carriage and the tool-carrying devices are provided with rollers which engage the cam surfaces to limit the depth of cut when the tools are moved toward the workpiece. The rollers also follow the cam surfaces during horizontal movement of the carriage to control the path followed by the work-engaging ends of the cutting tools. Thus, the depth of cut is determined by the vertical position of the cam plate and the external shape of the workpiece is determined by the shape of the cam surfaces.

Since it frequently is necessary to remove more metal from the workpiece than can be done in a single operation of the cutting tools, provision is made for vertically adjusting the cam plate. It will be apparent that the mechanism for adjusting the cam plate must be exceedingly sturdy since the plate sustains the combined thrust of the tool actuating hydraulic transmissions. According to the present invention, the adjustment is made by means of an elevating slide positioned behind the cam plate. The slide is formed with an inclined key which fits in a similarly inclined keyway in the cam plate so that the latter is raised and lowered by reciprocation of the slide. Actuation of the slide is effected by a separate hydraulic transmission. The tool carriage is first operated with the cam plate in the raised position so that the tools remove a portion of the excess metal from the workpiece and then operated with the cam plate in the lowered position to remove the rest of the metal.

Separate hydraulic circuits are provided. One circuit supplies fluid under pressure simultaneously to the tool carriage and tool actuating transmissions and the other circuit supplies fluid under pressure to the elevating slide transmission. Each of these hydraulic circuits includes a solenoid operated four-way valve which controls the direction of fluid flow therein. An electrical circuit is also provided which includes the solenoids, a manually operated master switch and switches operated automatically by moving parts of the machine.

The operation cycle is begun with the master switch open and the cam plate in the raised position. When the master switch is closed, the solenoid which controls the four-way valve in the first-mentioned hydraulic circuit is energized and positions the valve to direct fluid behind the pistons in this circuit. As a result, the cutting tools are moved downwardly toward the workpiece until the cam rollers engage the cam plate, and the tool carriage is actuated to move the tools longitudinally along the workpiece. At the end of the cutting stroke, the tool carriage operates a limit switch which deenergizes the above solenoid and energizes the solenoid which actuates the four-way valve in the second-mentioned hydraulic circuit. This operation reverses the four-way valve in the first hydraulic circuit to raise the cutting tools and retract the tool carriage, and simultaneously positions the four-way valve in the second hydraulic circuit to direct fluid under pressure behind the piston in that circuit so that the slide is moved longitudinally to lower the cam plate. When the tool carriage returns to its initial position, it operates a second limit switch which again energizes the first solenoid to repeat the cutting operation. This time, however, the cam plate is in the lowered position so that the cutting tools remove additional material from the workpiece. At the end of the second cutting stroke, the tool carriage again operates the first limit switch which then de-energizes both of the solenoids and returns all of the parts to the initial position.

In one hour, the lathe will handle about seven shell castings of the type hereinabove referred to and remove about 1,200 lbs. of excess metal. Under the circumstances, this is an exceedingly rapid operation and it will be readily appreciated that the efficacy of the machine is due to its unique construction and mode of operation.

For a more detailed description of the invention, reference is had to the accompanying drawings which show a heavy duty lathe having a base 10. Mounted in spaced relation on the base 10, is a headstock 12 and a tailstock 14 which co-operate in the conventional manner to clamp and rotatably drive the workpiece 16. The latter is here shown in the form of a forging from which a large caliber shell is to be made.

Disposed directly above the workpiece 16 are a plurality of cutting tools 18 and the present invention is primarily concerned with a mechanism for holding and substantially automatically operating these tools. This mechanism includes a vertical support 20 which is here shown in the form of a relatively massive hollow casting and is mounted on the base 10 intermediate behind and laterally of the headstock 12 and tailstock 14. Mounted for horizontal sliding movement on the front vertical face 22 of the support is a tool-carriage 24. Adjacent its lower edge the tool carriage 24 is formed with a laterally extending lip 26. The inner face of this lip defines a dovetail joint 28 which engages a correspondingly shaped shoulder 30 on the support 20. At its upper edge the tool carriage 24 is formed with a laterally extending lip 32 which overlays a vertical flange 34 on the support 20 and carries a guide strip 36 which projects downwardly behind the flange 34 and co-operates with the dovetail 28 in holding the tool carriage securely but slidably associated with the support. As best shown in Fig. 6, the guide strip 36 is detachably secured to the tool carriage 24 by bolts 38 so that the tool carriage can be readily mounted on or removed from the support. A longitudinally tapered gib 40 positioned between the flanges 42 and 44 on the support and tool carriage, respectively, is longitudinally adjustable to hold the dovetail joint 28 against the shoulder 30 and to compensate for wear due to frictional engagement between the support and tool carriage.

The tool carriage 24 is slidably actuated by a hydraulic transmission which comprises a cylinder 46 bolted or otherwise secured at one end of the support 20 and a piston 48 mounted for reciprocation in the cylinder. The piston 48 is provided with a piston rod 50 which extends through a stuffing box 52 in one end of the cylinder and is attached to the adjacent end of the carriage.

The cutting tools 18 are carried by and movable with the tool carriage 24 (Figs. 6 and 7). Each of the cutting tools 18 is mounted in a quill which is preferably in the form of a longitudinally divided sleeve. The quill sections 54 and 56 are provided with registering longitudinal channels 58 and 60, respectively, which co-operate to form a passage or socket for the upper portion of the cutting tool. The tool 18 preferably fits loosely in the socket and set screws 62 extending transversely through the front quill section 56 engage the tool shank to hold it solidly in the quill. If desired, the tool shank and the socket may be square in cross section as shown in Fig. 7 to prevent the tool from twisting or turning during operation of the machine. Disposed in the quill passage above the cutting tool is a backup block 64 and attached to the upper end of the quill is a cover plate 66 which carries a vertical adjusting screw 68. This screw extends into the quill passage and against the backup block 64 to adjust the cutting tool vertically and to limit upward movement thereof in the quill.

The lathe is here shown equipped with seven cutting tools although it is to be understood that any desired number may be provided. The number of tools can be varied depending upon the size of the workpiece 16.

The tool-holding quills are mounted for vertical sliding movement between the tool carriage 24 and a retaining plate 72 which is bolted or otherwise secured to the carriage. As shown in Fig. 7, the quill sections 54 fit in recesses 70 provided in the face of tool carriage 24 and the complementary quill sections 56 fit in registering recesses 74 provided in the rear face of the retaining plate 72. The outer surfaces of the quills are noncircular in shape and the recesses 70 and 74 are correspondingly shaped to prevent rotation or twisting of the quills.

The quills are slidably actuated by hydraulic transmissions which are carried by and movable with the tool carriage 24. As best shown in Fig. 6, the upper portion of the carriage is formed with a forward projection 76 which overhangs the quills. Cylinders 78 provided in the projection 76 are closed by a cylinder head 80 and pistons 82 mounted for reciprocation in the cylinders have piston rods 84 which extend downwardly through openings 86 and stuffing boxes 88 and connect with respective cover plates 66. The latter connections comprise headed studs 90 on the lower ends of the piston rods 84 which fit in correspondingly shaped recesses or guideways 92 in the cover plates 64.

From the foregoing, it will be readily apparent that pistons 82 move the cutting tools 18 vertically into and out of engagement with the workpiece 16 and that operation of piston 48 moves the tool carriage 24 horizontally. The workpiece 16 is rotatably driven by headstock 12 and horizontal travel of the tool carriage 24 causes the cutting tools 18 to move longitudinally along the workpiece. The tool carriage is moved a distance equal to or slightly greater than the distance between adjacent cutting tools 18 so that each cutting tool moves to or slightly beyond the position on the workpiece initially occupied by the preceding tool. Thus, an entire layer of metal is removed from the workpiece 16 by a single reciprocation of the tool carriage.

Suitable mechanism is provided for limiting downward movement of the cutting tools 18 and for controlling the tools during horizontal travel of the tool carriage 24. This mechanism is mounted in a horizontal elongated chamber 94 provided directly behind the tool quills and formed by registering recesses in the confronting faces of the support 20 and tool carriage 24.

Positioned foremost in the chamber 94 is a cam plate 96 which is bolted or otherwise secured to a backing plate 98. Forwardly projecting flanges 100 and 102 formed on the backing plate 98 embrace the upper and lower edges of cam plate 96 and abut against retainer plates 103 and 104 which are bolted to the support 20 and hold the cam plate spaced from the forward wall of the chamber. Spacers 105 wedged solidly between the backing plate 98 and forwardly projecting ears 106 provided on support 20 rigidly hold the plate against longitudinal movement and adjusting screws 107 carried by ears 106 forwardly of the spacers 105 provide for longitudinal adjustment of the cam plate 96.

Secured on the front of cam plate 96 are a plurality of cam blocks 108. As best shown in Fig. 3, the cam blocks 108 are arranged in two vertically spaced rows and the cam blocks in the two rows are disposed in staggered relation with each other. One cam block is provided for each of the cutting tools 18 and each cam block is positioned directly behind its respective cutting tool. Cam followers 110 attached to the rear surfaces of the quills by mounting plates 112 extend rearwardly through vertical slots 114 in the tool carriage 24 and project into the chamber 94 above respective cam blocks 108. Rollers 116 carried by the cam followers 110 engage the upper cam surfaces 118 of blocks 108 to limit downward movement of cutting tools 18. When the tool carriage 24 is moved horizontally, rollers 116 ride along the cam surfaces 118 which thus control the path followed by the cutting ends of the tools and determine the shape or contour of the workpiece 16. It will be observed that each of the cam surfaces 118 is inclined at one end as at 120. When the tools 18 are moved downwardly with the tool carriage 24 in the starting or retracted position, rollers 116 engage the inclined surfaces 120 and, as the carriage advances, the rollers move downwardly onto the surfaces 118. When the rollers move downwardly on the inclined surfaces 120 tools 18 cut into the workpiece 16 and, as the rollers traverse cam surfaces 118, the cutting tools remove continuous metal shavings from the workpiece.

As suggested, it frequently is necessary to remove a greater thickness of metal from the workpiece 16 than can be done conveniently in a single operation; accordingly, provision is made for vertically adjusting the cam plate 96. The tool carriage 24 can then be operated once with cam plate 96 in a raised position to remove a layer of metal from the workpiece 16 and then operated again with the cam plate in a lowered position to remove a second thickness of metal from the workpiece. Vertical adjustment of the cam plate 96 is achieved by an elevating slide 122 which is positioned behind the backing plate 98. The front surface of slide 122 is formed with a guide 124 which snugly fits a guideway 126 in the rear surface of the backing plate and both the guide and guideway are inclined slightly from the horizontal. Vertically spaced guides 128 attached to the support 120 project into vertical elongated guideways 130 in the rear surface of the retainer plate 98 and prevent the latter from moving horizontally. Thus, horizontal movement of slide 122 forces the retainer plate 98 and the attached cam plate 96 to move vertically in chamber 94 and relative to the rollers 116. It will be readily apparent that cam plate 96 is raised or lowered depending upon the direction slide 122 is moved.

Since the rollers 116 are pressed against the cam blocks 108 by the combined forces of pistons 82, the means for raising and lowering the cam plate must be exceedingly sturdy. In practice, the arrangement here shown has proven to be eminently satisfactory. Slide 122 is efficacious in holding the cam plate in the selected adjusted position and in sustaining the combined thrust of the various hydraulic transmissions which actuate the cutting tools 18.

Slide 122 is reciprocated by a suitable hydraulic transmission which comprises a cylinder 132 and piston 134. Cylinder 132 is attached adjacent one end of the support 20 and piston 134 has a piston rod 136 which extends from the cylinder through an opening 138 and stuffing box 140. The piston rod 136 is attached to a bracket 142 which is bolted or otherwise secured to slide 122 and extends rearwardly through a horizontally elongated slot 144 in the support 20. From the foregoing, it will be readily apparent that reciprocation of piston 134 moves slide 122 horizontally to raise and lower the cam plate 96. Movement of the slide is limited by set screws 145 carried by ears 106 as best shown in Fig. 5.

Attention is now directed to Fig. 9 which diagrammatically illustrates the hydraulic system for operating the various hydraulic transmissions. This system comprises two circuits one of which simultaneously serves the transmissions which actuate the tool carriage and cutting tools while the other serves the transmission which actuates the slide 122.

Fluid under pressure is supplied to the first-mentioned circuit from a suitable pump 147 through a fluid supply line 146 which leads to the inlet of a solenoid actuated four-way valve 148. In one position of the four-way valve 148, the fluid discharges through a pipe 152 simultaneously to cylinder 46 behind piston 48 and to each of the cylinders 76 behind pistons 82. Fluid in cylinder 46 ahead of piston 48 discharges through pipes 154 and 156, metering valve 158 and pipes 160, 162 and 164 back to the four-way valve 148 and thence through pipes 166 and 168 to a suitable sump or container 169. The metering valve 158 is adjustable in the conventional manner to regulate the rate of flow through the discharge pipe and thus controls the speed at which piston 48 advances. Any leakage past the valve drains through pipe 170 back to the container. It will be observed that the metering valve 158 is by-passed by a pipe 172 which is controlled by check valve 174. When fluid flows through the hydraulic circuit in the direction described above, check valve 174 is closed so that fluid is forced to discharge through the metering valve 158. However, when the four-way valve 148 is reversed to change the direction of flow of fluid in the circuit, it is desirable that piston 48 retracts rapidly and check valve 174 automatically opens so that the fluid by-passes the metering valve 158.

The second-mentioned hydraulic circuit comprises a fluid supply pipe 176 which branches from the main pipe 146 and connects with an inlet of a second solenoid actuated four-way valve 178. In one position of four-way valve 178, fluid is conducted to cylinder 132 behind piston 134 through pipe 182 and fluid in the cylinder 134 ahead of piston 134 is conducted back to the four-way valve 178 by pipe 184 and thence discharges through pipe 186 to the fluid return pipe 168. It will be readily appreciated that four-way valve 178 is operated in the conventional manner to reverse the direction of flow of fluid in the circuit so that fluid under pressure can be conducted through pipe 184 to cylinder 132 ahead of piston 134 and discharged to the sump or container through pipe 182.

The electric circuit which controls the operation of four-way valves 148 and 178 is shown schematically in Fig. 8. This circuit includes a transformer having a primary coil 188, a secondary coil 190 and a core 192. Current from any suitable source is conducted to the primary coil 188 through a wire 194 and, after traversing the primary coil, is conducted back to the source through a wire 195. Solenoids 196 and 197 which actuate the four-way valves 148 and 178, respectively, are connected in parallel with the primary coil 188 by wires 198, 200, 202 and 204. Wires 198 and 200 are controlled by normally open switches B—1 and B—2, respectively, while wires 202 and 204 are controlled by normally open switches C—1 and C—2.

The secondary coil 190 is connected in four separate circuits. In the first circuit it is connected in series with a relay coil A, a limit switch 206a, a normally closed emergency stop switch 208, a normally open cycle start switch 210 and a normally open switch 212 by wires 214, 216, 218, 220, 222, 224, 226 and 228. Limit switch 206a is by-passed by a wire 230 which is controlled by a normally closed switch D—1. The cycle start switch 210 is by-passed by a wire 232 which is controlled by a normally open switch A—1.

In the second circuit the coil 190 is connected in series with a normally open switch A—2, a relay coil B and a normally closed switch C—3 by wires 234, 236, 238, 240, and 242. The normally closed switch C—3 is by-passed by a wire 244 which is controlled by a normally open switch D—2.

In the third circuit the secondary coil 190 is connected in series with the normally open switch A—2, a relay coil C and a limit switch 206b by wires 234, 246, 250, 252, 254, 256, 242 and 228.

Switch 206b is by-passed by a wire 258 which is controlled by the normally open switch C—4. The dotted line connecting limit switches 206a and 206b indicates that these switches are coactive so that closing of one of these switches automatically opens the other. It will be observed, however, that this switch is normally held in the position shown in the drawing by a spring 259 or the like.

In the fourth circuit the secondary coil 190 is connected in series with the normally open switch A—2, a relay coil D, a limit switch 260 and a normally open switch C—5 by wires 234, 246, 262, 264, 266, 268, 269, 256, 242 and 228. Limit switch 260 is held normally open by a spring 270 or the like and is by-passed by a wire 272 which is controlled by a normally open switch D—3.

In the above circuits, switch 210 is manually closed to start the cycle of operation and switch 212 is closed automatically by parts of the machine when the workpiece 16 is clamped between the headstock 12 and tailstock 14. Energization of the relay coil A simultaneously closes the two switches A—1 and A—2, energization of the relay coil B simultaneously closes the switches B—1 and B—2, energization of the relay coil C simultaneously closes switches C—1, C—2, C—4 and C—5 and opens switch C—3 and energization of the relay coil D simultaneously opens switch D—1 and closes switches D—2 and D—3. Limit switches 206 and 260 are operated by a dog 273 on the tool carriage 24 as illustrated diagrammatically in Fig. 9. These switches are positioned so that dog 273 operates switch 206 when the carriage is in the fully advanced position and operates switch 260 when the carriage is fully retracted.

Before the cycle of operation is begun, the cutting tools 18 are in the raised position and out of engagement with the workpiece 16 as shown in Fig. 1 and the tool carriage 24 is retracted to position the cam rollers 116 directly above the inclined portions 120 of the cam surfaces 118. The work piece 16 is clamped between the headstock 12 and tailstock 14 and rotatably driven thereby. As suggested, this operation automatically closes switch 212. Current flows through the primary coil 188 but no current flows through the secondary coil 190 because of the open switches 210 and A—2.

To start the cycle of operation, the operator manually closes the cycle start switch 210. Current then flows through the first-mentioned secondary circuit to energize the relay coil A which closes switches A—1 and A—2. Switch A—1 merely serves to hold the circuit closed when the manually operated switch 210 is released; however, switch A—2 permits current to flow through the second-mentioned secondary circuit to energize the relay coil B which then closes switches B—1 and B—2. As soon as the latter switches are closed, current also flows through solenoid 196 which becomes energized and positions the four-way valve 148 to direct fluid under pressure through the first-mentioned hydraulic circuit in the direction indicated by the arrows in Fig. 9. Since no resistance is imposed upon the cutting tool actuating pistons 182 until the cam rollers 116 engage the cam blocks 108, all these cutting tools are simultaneously lowered toward the rotating workpiece 16 and until the cam rollers engage the inclined surfaces 120. As soon as this occurs, the cutting tools are prevented from moving further in the direction of the workpiece 16 and hydraulic pressure in cylinder 46 moves piston 48 and the tool carriage 24 to the left as viewed in the drawings. During the initial movement of the carriage the cam rollers 116 move downwardly on the inclined portions 120 and onto the cam surfaces 118. As the cam rollers 116 traverse the portions 120, the cutting tools 18 are lowered still farther and into engagement with the workpiece 16. After the cam rollers move onto the cam surfaces 118, continued advancement of the tool carriage 24 causes each of the cutting tools 18 to remove a metal shaving from the workpiece 16. Since hydraulic pressure is maintained at all times on the pistons 82, the cam rollers 116 are continually pressed against the cam surfaces 118 which thus control both the depth of cut and the contour of the workpiece.

At substantially the time carriage 24 completes its forward movement dog 273 opens switch 206a and closes switch 206b. When switch 206a opens, it does not interrupt the first-mentioned secondary circuit since current continues to flow through the normally closed switch D—1; however, when switch 206b closes, it establishes current flow through the third-mentioned secondary circuit to energize the relay coil C which then closes switches C—1, C—2, C—4 and C—5 and opens switch C—3. Even though switch C—5 is closed no current flows through the fourth-mentioned secondary circuit because of the open limit switch 260. However, as soon as switch C—3 opens it interrupts current flow through the second-mentioned secondary circuit and de-energizes solenoid 196 which then positions the four-way valve 148 to direct fluid through the first-mentioned hydraulic circuit in a direction opposite to that indicated by the arrows in Fig. 9. When switches C—1 and C—2 close, current flows then through solenoid 197, which when energized, positions the four-way valve 178 to direct fluid through the second-mentioned hydraulic circuit in the direction indicated by the arrows in Fig. 9.

It will be observed that at this stage two operations occur simultaneously. Fluid under pressure entering cylinders 76 below pistons 82 move all of the cutting tools 18 and the coactive cam rollers 116 upwardly out of engagement with the workpiece 16 and cam surfaces 118. At the same time, fluid under pressure enters cylinder 46 ahead of piston 48 and retracts tool carriage 44. While the cutting tools 18 are raised from the workpiece 16 and the tool carriage 24 is being retracted, hydraulic fluid in the second-mentioned hydraulic circuit advances slide 122 to lower the cam plates 96. The latter operation is completed before the tool carriage 24 completes its return stroke. As soon as the tool carriage 24 begins its return stroke it releases limit switch 206 and spring 259 returns the switch to the position shown in Fig. 8; however, the relay coil C is not de-energized when switch 206b opens because of closed switch C—4.

At substantially the time tool carriage 24 reaches the end of its return stroke, dog 273 closes limit switch 260 against the action of spring 270. This operation energizes the relay coil D which then opens switch D—1 and closes switches D—2 and D—3. However, the open switch D—1 does not interrupt flow of current through the relay coil A, because switch 206a is closed. As soon as switch D—2 closes current again flows through the second-mentioned secondary circuit to energize the relay coil B. From the foregoing, it will be readily apparent that, at this stage, all four of the secondary circuits are energized. The energized relay coil B again closes switches B—1 and B—2 to energize solenoid 196 which then positions the four-way valve 148 to again direct flow of fluid through the first hydraulic circuit in the direction indicated by the arrows in Fig. 9. Fluid pressure in cylinders 76 again moves the cutting tools 18 downwardly and fluid pressure in cylinder 46 advances the tool carriage 24. As the carriage 24 begins to advance for the second time, it releases limit switch 260 which is then opened by spring 270 but the relay coil D remains energized because of the closed switch D—3. Since the cam plate 96 is in the lowered position during the second operation of the tool carriage 24, the cutting tools 18 remove an additional amount of metal from workpiece 16.

When the tool carriage 24 reaches the end of its second cutting stroke, it again operates limit switch 206, opening switch 206a and closing switch 206b. This time, however, switch D—1 is open so that the flow of current through the first-mentioned secondary circuit is interrupted as soon as switch 206a is opened. This deenergizes the coil relay A and opens switches A—1 and A—2. Obviously, as soon as switch A—2 opens, the current is interrupted through each of the second, third and fourth secondary circuits to deenergize the relay coils B, C and D. Deenergization of relays B and C opens switches B1, B2 and C1, C2 to interrupt flow of current through the solenoids 196 and 197. As soon as the two solenoids are deenergized, four-way valves 148 and 178 reverse so that fluid flows through both of the hydraulic circuits in a direction opposite to that indicated by the arrow in Fig. 9. Hydraulic fluid in the circuits then raises all of the pistons 82 and retracts both of the pistons 48 and 134 to simultaneously move the cutting tools 18 away from workpiece 16, retract the tool carriage 24 to its initial or starting position and retract slide 122 to raise the cam plate 96.

When the tool carriage 24 returns to its initial starting position, it stops and all of the tool-carrying and operating parts remain stationary until the cycle start switch 210 is again closed.

It is to be understood that the form of the invention herewith shown and described is to be taken as a preferred example of the same and that various changes in the size, shape and arrangement of parts may be resorted to without departing from the spirit of the invention or the scope of the appended claims.

What is claimed is:

1. In an automatic lathe having mechanism for holding and rotatably driving a workpiece, a support; a tool carriage slidably mounted on the support; a plurality of tool-carrying devices each provided with a cam follower, said devices mounted for reciprocation in the carriage and adapted to move said tools relative to the workpiece; means for limiting movement of the tools toward the workpiece and controlling the path followed by the work-engaging ends of the tools during travel of said carriage including a cam plate provided with cam surfaces engaged by the cam followers, and an elevating slide coactive with the cam plate to move the cam surfaces to different adjusted positions relative to said cam followers; hydraulic transmissions for said carriage, said tool-carrying devices and said elevating slide; and a hydraulic circuit for supplying fluid under pressure to each of said hydraulic transmissions.

2. In an automatic lathe having mechanism for holding and rotatably driving a workpiece, a support; a tool carriage slidably mounted on the support; a plurality of tool-carrying devices each provided with a cam follower, said devices mounted for reciprocation in the carriage and adapted to move said tools relative to the workpiece; means for limiting movement of the tools toward the workpiece and for controlling the path followed by the work-engaging ends of the tools during travel of said carriage including a cam plate provided with cam surfaces engaged by the cam followers, and an elevating slide coactive with the cam plate to move the cam surfaces to different adjusted positions relative to the cam followers; hydraulic transmissions for said carriage, said tool-carrying devices and said elevating slide; hydraulic circuits for supplying fluid under pressure to each of said hydraulic transmissions, said hydraulic circuits including at least one solenoid actuated directional control valve; and an electric circuit including said solenoid and switch means actuated by the carriage.

3. In an automatic lathe having mechanism for holding and rotatably driving a workpiece, a support; a tool carriage slidably mounted on the support; a plurality of tool-carrying devices each provided with a cam follower, said devices mounted for reciprocation in the carriage and adapted to move said tools relative to the workpiece; means for limiting movement of the tools toward the workpiece and controlling the path followed by the work-engaging ends of the tools during travel of said carriage including a cam plate provided with cam surfaces engaged by the cam followers, and an elevating slide coactive with the plate to move said cam surfaces to different adjusted positions relative to the cam followers; hydraulic transmissions for said carriage, said tool-carrying devices and said elevating slide; hydraulic circuits for supplying fluid under pressure to said hydraulic transmissions, said hydraulic circuits including a first solenoid operated directional control valve for controlling said first and second-mentioned hydraulic transmissions and a second solenoid operated directional control valve for controlling the last-mentioned hydraulic transmission; and an electric circuit including said solenoids and switch means actuated by said carriage.

4. In an automatic lathe having mechanism for holding and rotatably driving a workpiece, a support; a tool carriage slidably mounted on the support; a plurality of tool-carrying devices each provided with a cam follower, said devices mounted for reciprocation in the carriage and adapted to move said tools relative to the workpiece; means for limiting movement of the tools toward the workpiece and controlling the path followed by the work engaging ends of the tools during travel of said carriage including a cam plate provided with cam surfaces engaged by the cam followers, and an elevating slide coactive with same cam plate to move the cam surfaces to different adjusted positions relative to the cam followers; hydraulic transmissions for said carriage, said tool-carrying devices and said elevating slide; hydraulic circuits for supplying fluid under pressure to said hydraulic transmissions, said hydraulic circuits including solenoid actuated directional control valves for controlling the direction of flow of fluid in the circuits; and a metering valve for controlling the rate of flow of fluid from said first transmission when the tools are making their cutting strokes.

5. In an automatic lathe having mechanism for holding and rotatably driving a workpiece, a support; a tool carriage slidably mounted on the support; a plurality of tool carrying devices each provided with a cam follower, said devices mounted for reciprocation in the carriage and adapted to move said tools relative to the workpiece; means for limiting movement of the tools toward the workpiece and controlling the path followed by the work-engaging ends of the tools during travel of said carriage including a cam plate provided with cam surfaces engaged by the cam followers, and an elevating slide coactive with the plate to move the same to different adjusted positions relative to the cam followers; hydraulic transmission for said carriage, said tool-carrying devices and said elevating slide; hydraulic circuits for supplying fluid under pressure to said hydraulic transmissions, said hydraulic circuit including a first solenoid actuated directional control valve for controlling the first and second-mentioned transmissions and a second solenoid actuated directional control valve for controlling the last-mentioned transmission; and a metering valve for controlling the rate of flow of fluid from said first transmission when the tools are making their cutting strokes.

6. In an automatic lathe having mechanism for holding and rotatably driving a workpiece, a support; a tool carriage slidably mounted on the support; a plurality of tool carrying devices each provided with a cam follower, said devices mounted for reciprocation in the carriage and adapted to move said tools relative to the workpiece; means for limiting movement of the tools toward the workpiece and controlling the path followed by the work-engaging ends of the tools during travel of said carriage including a cam plate provided with cam surfaces engaged by the cam followers, and an elevating slide coactive with said cam plate to move the cam surfaces to different adjusted positions relative to the cam followers; hydraulic transmissions for said carriage, said tool-carrying devices and said elevating slide; hydraulic circuits for supplying fluid under pressure to said hydraulic transmissions, said hydraulic circuits including solenoid actuated directional control valves for controlling the direction of flow of fluid in the circuits; a metering valve for controlling the rate of flow of fluid from said first transmission when the tools are making their cutting strokes; and an electric circuit including said solenoids and switch means actuated by said carriage.

7. In an automatic lathe having mechanism for holding and rotatably driving a workpiece, a support; a tool carriage slidably mounted on the support; a plurality of tool-carrying devices each provided with a cam follower, said devices mounted for reciprocation in the carriage and adapted to move said tools relative to the workpiece; means for limiting movement of the tools toward the workpiece and controlling the path followed by the work-engaging ends of the tools during travel of said carriage including a cam plate provided with cam surfaces engaged by the cam followers, and an elevating slide coactive with the plate to move the same to different adjusted positions relative to the cam followers; hydraulic transmission for said carriage, said tool-carrying and said elevating slide; hydraulic circuits for supplying fluid under pressure to said hydraulic transmissions, said hydraulic circuit including a first solenoid actuated directional control valve for controlling the first and second-mentioned transmissions and a second solenoid actuated directional control valve for controlling the last-mentioned transmission; a metering valve for controlling the rate of flow of fluid from said first transmission when the tools are making their cutting strokes; and an electric circuit including said solenoids and switch means actuated by said carriage.

RALPH E. CROSS.
KURT O. TECH.

REFERENCES CITED

The following references are of record in the file of this patent:

UNITED STATES PATENTS

| Number | Name | Date |
|---|---|---|
| 172,480 | Piat | Jan. 18, 1876 |
| 689,845 | Barrow | Dec. 31, 1901 |
| 861,567 | Winckelmann | July 30, 1907 |
| 1,239,422 | Michel-Levg | Sept. 4, 1917 |
| 1,933,055 | Hague | Oct. 31, 1933 |
| 2,002,933 | Buell | May 28, 1935 |
| 2,017,371 | Morris | Oct. 15, 1935 |
| 2,118,020 | Curtis | May 17, 1938 |
| 2,338,125 | May | Jan. 4, 1944 |
| 2,342,792 | Dare | Feb. 29, 1944 |
| 2,377,239 | Kasen | May 29, 1945 |
| 2,433,027 | Casella | Dec. 23, 1947 |

FOREIGN PATENTS

| Number | Country | Date |
|---|---|---|
| 481,831 | Great Britain | May 18, 1938 |